(12) United States Patent
Decarreau et al.

(10) Patent No.: US 9,491,653 B2
(45) Date of Patent: Nov. 8, 2016

(54) RADIO MEASUREMENTS IN CELL_FACH

(75) Inventors: Guillaume Decarreau, Beijing (CN); Woonhee Hwang, Espoo (FI); Karri Markus Ranta-Aho, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 140 days.

(21) Appl. No.: 14/349,448

(22) PCT Filed: Sep. 13, 2012

(86) PCT No.: PCT/EP2012/067894
§ 371 (c)(1),
(2), (4) Date: Apr. 3, 2014

(87) PCT Pub. No.: WO2013/050226
PCT Pub. Date: Apr. 11, 2013

(65) Prior Publication Data
US 2014/0241202 A1    Aug. 28, 2014

(30) Foreign Application Priority Data
Oct. 3, 2011  (WO) ................. PCT/EP2011/067216

(51) Int. Cl.
H04L 12/26 (2006.01)
H04W 24/10 (2009.01)

(52) U.S. Cl.
CPC ................................. H04W 24/10 (2013.01)

(58) Field of Classification Search
CPC ... H04B 17/24; H04B 17/309; H04W 40/12; H04L 5/1438
See application file for complete search history.

(56) References Cited

U.S. PATENT DOCUMENTS

| | | | |
|---|---|---|---|
| 6,445,917 B1 * | 9/2002 | Bark | H04W 24/00 370/331 |
| 2009/0168728 A1 | 7/2009 | Pani et al. | 370/332 |
| 2010/0323633 A1 * | 12/2010 | Pani | H04W 24/10 455/67.14 |
| 2011/0105119 A1 * | 5/2011 | Bienas | H04W 36/0055 455/436 |
| 2011/0207465 A1 * | 8/2011 | Dwyer | H04W 76/046 455/450 |
| 2012/0314589 A1 * | 12/2012 | Chen | H04W 24/10 370/252 |
| 2013/0029651 A1 * | 1/2013 | Martin | H04W 52/0229 455/418 |
| 2013/0045693 A1 * | 2/2013 | Chen | H04W 24/10 455/67.13 |
| 2013/0182586 A1 * | 7/2013 | Paladugu | H04W 76/046 370/252 |

OTHER PUBLICATIONS

3GPP TSG-RAN Meeting #53, Fukuoka, Japan, Sep. 13-16, 2011, RP-111321, "WID update to Further Enhancements to CELL-FACH", Qualcomm Inc., ZTE Corp., Telecom Italia, Huawei, HiSilicon, TeliaSonera, Nokia Siemens Networks, Renesas Electronic Europe, 6 pgs.
3GPP TSG-RAN Meeting #52, Bratislava, Slovakia, May 31-Jun. 3, 2011, RP-111321, "WID update to Further Enhancements to CELL_FACH", Renesas Mobile Europe, TeliaSonera, Ericsson, ST-Ericsson, 9 pgs.

(Continued)

Primary Examiner — Alvin Zhu
(74) Attorney, Agent, or Firm — Harrington & Smith

(57) ABSTRACT

It is provided an apparatus, including flag detecting means adapted to detect a received flag; state detecting means adapted to detect if the apparatus communicates in a forward access channel state; measuring means adapted to perform, if the apparatus communicates in the forward access channel state, a measurement only if the flag is detected, wherein the measurement is radio related.

11 Claims, 2 Drawing Sheets

(56) References Cited

OTHER PUBLICATIONS

3GPP TSG-RAN WG2 Meeting #75, Athens, Greece, Aug. 22-26, 2011, R2-114160, "Absolute Priority Cell reselection in cell-FACH", Qualcomm, 5 pgs.

3GPP TSG-RAN WG2 Meeting #75, Athens, Greece, Aug. 22-26, 2011, R2-114350, "Reselection from UTRAN CELL_FACH state to EUTRAN", 3 pgs.

3GPP TSG-RAN WG2 Meeting #75, Athens, Greece, Aug. 22-26, 2011, R2-114351, "Addition of measurements and reselection from UTRAN CELL_FACH to E-UTRAN", Renesas Mobile Europe Ltd., ST-Ericsson, 11 pgs.

3GPP TS 25.331 V10.4.0 (Jun. 2011), "$3^{rd}$ Generation Partnership Project; Technical Specification Group Radio Access network; Radio Resource Control (RRC); Protocol specification (Release 10)", Sections 7.1 and 8.4.1.6.3, 3pgs.

* cited by examiner

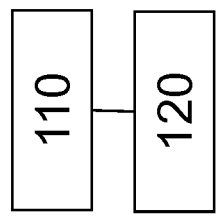
Fig. 2
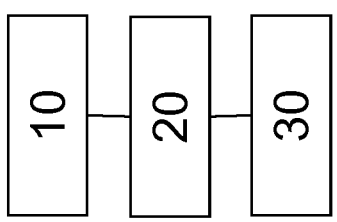
Fig. 4
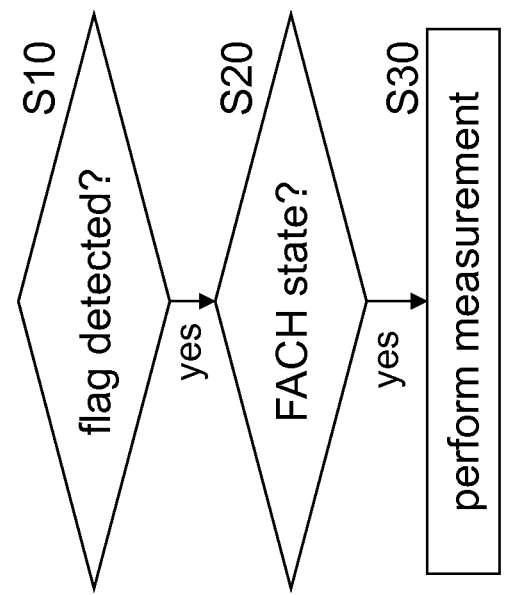

RADIO MEASUREMENTS IN CELL_FACH

FIELD OF THE INVENTION

The present invention relates to an apparatus, a method, a system, and a computer program product related to improving the forward access channel mode. More particularly, the present invention relates to an apparatus, a method, a system, and a computer program product for radio measurements in the forward access channel mode.

BACKGROUND OF THE INVENTION

Abbreviations

3GPP Third Generation Partnership Project
DCH Dedicated Channel
DL Downlink
DRX Discontinuous Reception
DSCH Downlink Shared Channel
DTX Discontinuous Transmission
FACH Forward Access Channel
ID Identification
IE Information Element
LTE Long Term Evolution
MP mandatory part
OP optional part
PCH Paging Channel
RACH Random Access Channel
RAT Radio Access Technology
RB Radio Bearer
Rel Release
RNC Radio Network Controller
RRC Radio Resource Control
TDD Time Division Duplex
TS Technical Specification
UE User Equipment
UL Uplink
UMTS Universal Mobile Telecommunications System
USCH Uplink Shared Channel
UTRA UMTS Terrestrial Radio Access
UTRAN UMTS Terrestrial Radio Access Network In the current 3GPP specifications of Rel-10, the mobility in CELL_FACH is based on Cell reselection, which is controlled by the UE. Furthermore, there is no mobility to LTE.

The CELL_FACH state (hereinafter also named FACH state or forward access channel state) is a protocol state of the UTRA RRC connected mode and may be characterized as follows (see http://www.umtsworld.com/technology/RCC_states.htm):

No dedicated physical channel is allocated to the UE.
The UE continuously monitors a FACH in the downlink.
The UE is assigned a default common or shared transport channel in the uplink (e.g. RACH) that it can use anytime according to the access procedure for that transport channel.
The position of the UE is known by UTRAN on cell level according to the cell where the UE last made a cell update.
In TDD mode, one or several USCH or DSCH transport channels may have been established.

Further details of the FACH state are defined in 3GPP TS25.331. FIG. 1, taken from v10.4.0 of this TS (section 7.1), shows the currently (Rel-10) defined protocol states of the UTRA RRC connected mode and the transitions between the protocol states and to other modes.

In the Work Item Further Enhanced Cell_FACH (RP-111321) for Rel-11, mobility to LTE, as well as UTRAN inter-frequency are discussed. One of the approaches is to have Network Controlled mobility, i.e. the network may give the mobility order to the UE.

In the current specifications (Rel-10), the inter RAT radio related measurements are stopped when entering CELL_FACH (TS 25.331 v10.4.0, section 8.4.1.6.3). In order to introduce Network Controlled Mobility, one way forward is to allow some Radio Related measurements to take place in CELL_FACH.

The mobility in CELL_FACH has been discussed in the context of Autonomous Cell Reselection (see R2-114350).

In LTE Systems, in connected mode, the mobility is always network controlled, even if DRX and DTX are running to limit the UL and DL transmissions (see TS 25.331 v10.2.0, section 5.3.1.3).

SUMMARY OF THE INVENTION

It is an object of the present invention to improve the prior art.

In particular, it is an object to allow for network controlled mobility without strongly increasing the power consumption of the UE.

According to a first aspect of the invention, there is provided an apparatus, comprising flag detecting means adapted to detect a received flag; state detecting means adapted to detect if the apparatus communicates in a forward access channel state; measuring means adapted to perform, if the apparatus communicates in the forward access channel state, a measurement only if the flag is detected, wherein the measurement is radio related.

The apparatus may further comprise transmitting means adapted to transmit a result of the measurement in the forward access channel state.

The apparatus may further comprise parameter detecting means adapted to detect a parameter in a received reconfiguration message; inhibiting means adapted to inhibit the measuring means from performing the measurement if the apparatus communicates in the forward access channel state and the parameter is not detected.

The apparatus may further comprise selecting means adapted to select a frequency of a radio access technology based on a received priority information, wherein the measuring means may be further adapted to perform the measurement related to the selected frequency.

According to a second aspect of the invention, there is provided an apparatus, comprising flag detecting processor adapted to detect a received flag; state detecting processor adapted to detect if the apparatus communicates in a forward access channel state; measuring processor adapted to perform, if the apparatus communicates in the forward access channel state, a measurement only if the flag is detected, wherein the measurement is radio related.

The apparatus may further comprise transmitting processor adapted to transmit a result of the measurement in the forward access channel state.

The apparatus may further comprise parameter detecting processor adapted to detect a parameter in a received reconfiguration message; inhibiting processor adapted to inhibit the measuring processor from performing the measurement if the apparatus communicates in the forward access channel state and the parameter is not detected.

The apparatus may further comprise selecting processor adapted to select a frequency of a radio access technology based on a received priority information, wherein the measuring processor may be further adapted to perform the measurement related to the selected frequency.

According to a third aspect of the invention, there is provided a user equipment comprising an apparatus according to any of the first and second aspects.

According to a fourth aspect of the invention, there is provided an apparatus, comprising flag providing means adapted to provide, to a user equipment, a flag associated to a radio related measurement; message providing means adapted to provide a reconfiguration message to the user equipment, wherein the reconfiguration message orders the user equipment to go into a forward access channel state and comprises an identification of the radio related measurement.

The apparatus may further comprise priority providing means adapted to provide a priority information related to a frequency for which the measurement is to be performed.

According to a fifth aspect of the invention, there is provided an apparatus, comprising flag providing processor adapted to provide, to a user equipment, a flag associated to a radio related measurement; message providing processor adapted to provide a reconfiguration message to the user equipment, wherein the reconfiguration message orders the user equipment to go into a forward access channel state and comprises an identification of the radio related measurement.

The apparatus may further comprise priority providing processor adapted to provide a priority information related to a frequency for which the measurement is to be performed.

According to a sixth aspect of the invention, there is provided a base station, comprising an apparatus according to any of the fourth and fifth aspects.

According to a seventh aspect of the invention, there is provided a system, comprising a user equipment apparatus according to any of the first and second aspects; a base station apparatus according to any of the fourth and fifth aspects; wherein the forward access channel state of the user equipment apparatus corresponds to the forward access channel state of the base station apparatus; the flag received by the user equipment apparatus comprises the flag provided by the base station apparatus; the reconfiguration message received by the user equipment apparatus comprises the reconfiguration message provided by the base station apparatus, wherein the parameter detected by the user equipment apparatus comprises the identification of the radio related measurement provided by the base station apparatus.

According to an eighth aspect of the invention, there is provided a method, comprising detecting a received flag; detecting if an apparatus performing the method communicates in a forward access channel state; performing, if the apparatus communicates in the forward access channel state, a measurement only if the flag is detected, wherein the measurement is radio related.

The method may be a method of forward access channel state control.

The method may further comprise transmitting a result of the measurement in the forward access channel state.

The method may further comprise detecting a parameter in a received reconfiguration message; inhibiting performing the measurement if the apparatus communicates in the forward access channel state and the parameter is not detected.

The method may further comprise selecting a frequency of a radio access technology based on a received priority information, wherein the measurement may be performed related to the selected frequency.

According to a ninth aspect of the invention, there is provided a method, comprising providing, to a user equipment, a flag associated to a radio related measurement; providing a reconfiguration message to the user equipment, wherein the reconfiguration message orders the user equipment to go into a forward access channel state and comprises an identification of the radio related measurement.

The method may be a method of forward access channel state control.

The method may further comprise providing a priority information related to a frequency for which the measurement is to be performed.

According to a tenth aspect of the invention, there is provided a computer program product including a program comprising software code portions being arranged, when run on a processor of an apparatus, to perform the method according to any one of eighth and ninth aspects.

The computer program product may comprise a computer-readable medium on which the software code portions are stored, and/or the program may be directly loadable into a memory of the processor.

According to embodiments of the invention, at least the following advantages are achieved:

Network controlled mobility from the FACH state may be achieved without strongly increasing the power consumption. The additional signaling load on the uplink may be limited to the transmission of measurement results required for a reliable mobility decision by the network. Downlink signaling may be increased only very little or not increased at all.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein

FIG. 2 shows an apparatus according to an embodiment of the invention;

FIG. 3 shows a method according to an embodiment of the invention;

FIG. 4 shows an apparatus according to an embodiment of the invention; and

FIG. 5 shows a method according to an embodiment of the invention.

DETAILED DESCRIPTION OF CERTAIN EMBODIMENTS

Figure 1:
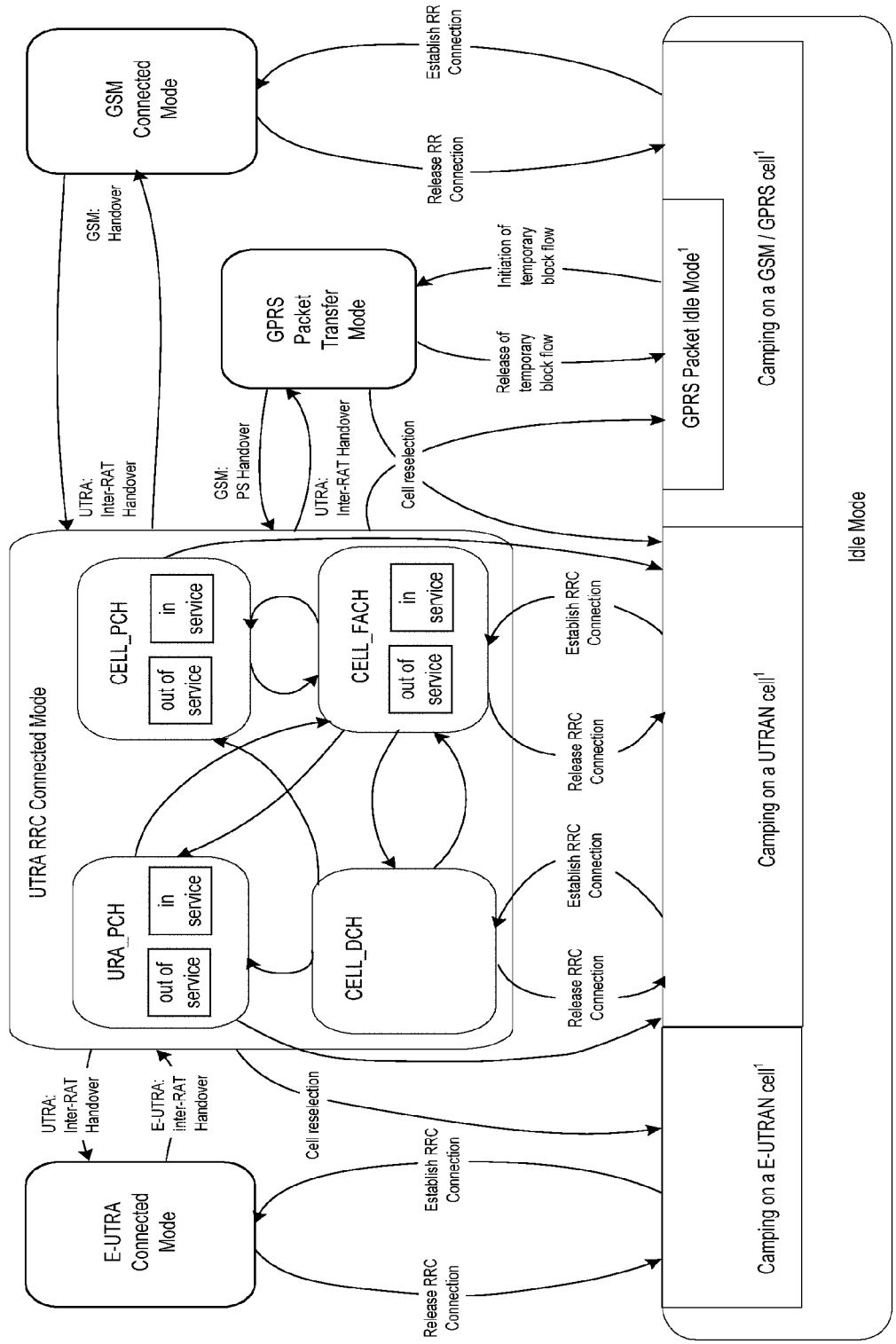
FIG. 1 shows the RRC states defined in Rel-10.

Herein below, certain embodiments of the present invention are described in detail with reference to the accompanying drawings, wherein the features of the embodiments can be freely combined with each other unless otherwise described. However, it is to be expressly understood that the description of certain embodiments is given for by way of example only, and that it is by no way intended to be understood as limiting the invention to the disclosed details.

Moreover, it is to be understood that the apparatus is configured to perform the corresponding method, although in some cases only the apparatus or only the method are described.

The radio related measurements may be configured by the network for CELL_DCH. However, if they should be used in CELL_FACH, the parameters may be different. Furthermore, only some of the measurements configurable for CELL_DCH may be needed in case UE is measuring in CELL_FACH for the CELL_FACH mobility.

According to embodiments of the invention, in the MEASUREMENT CONTROL Message of the DCH state, a flag may indicate if the associated measurement is to be used by the UE in CELL_FACH, too . . . .

For example, if the flag is off, the associated measurement may only take place in CELL_DCH but not in CELL_FACH. If the flag is on, the associated measurement may be performed in CELL_FACH.

In some embodiments, a corresponding flag may indicate that the associated measurement is to be used by the UE in CELL_FACH only. In these cases, if the flag is off (or, if the flag is not included in the MEASUREMENT CONTROL message) the associated measurement may not take place in CELL_DCH nor in CELL_FACH, but if the flag is on (or, if the flag is included in the MEASUREMENT CONTROL message) the associated measurement must not be performed in CELL_DCH but may be performed in CELL_FACH.

Some embodiments may comprise both of these flags. Thus, the following ways to perform a measurement may be defined:

The measurement will be performed in CELL_DCH only;
The measurement will be performed in CELL_FACH only; and
The measurement will be performed in CELL_DCH and CELL_FACH.

More in detail, in some embodiments, the MEASUREMENT CONTROL message of the DCH state may comprise an additional optional information element, e.g. named LTE Measurement in CELL_FACH. The presence of this IE may indicate that the measurement of this measurement ID may take place in CELL_FACH, or alternatively would not be performed in CELL_DCH but may be performed in CELL_FACH only. An example is given in Table 1:

TABLE 1

| Information Element/Group name | Need | Multi | Type and reference | Semantics description |
| --- | --- | --- | --- | --- |
| LTE Measurement in CELL_FACH | OP | | Enumerated (TRUE) | The presence of this IE indicates that this Measurement ID can take place in CELL_FACH |

In some embodiments, the UE will additionally check if the network explicitly (by a dedicated message to the UE) instructs the UE by a set of parameters to perform the associated measurement. Only if the flag is on and the UE is explicitly instructed, the measurement may be performed in CELL_FACH, otherwise not.

More in detail, in some embodiments, in the message that orders the UE to enter CELL_FACH state, the network may list the Measurement ID of the measurements that will take place in CELL_FACH state.

The UE may be ordered to go to CELL_FACH based on a RADIO BEARER RECONFIGURATION message. In some embodiments, this message may comprise one or more IEs indicating which measurements shall be performed (active) in CELL_FACH state. An example of such additional IEs is given in Table 2:

TABLE 2

| Information Element/Group name | Need | Multi | Type and reference | Semantics description |
| --- | --- | --- | --- | --- |
| Active Measurement ID in FACH | OP | 1 . . . Max Meas ID | | The listed measurements shall be active in CELL_FACH. If not listed the measurement should not take place in CELL_FACH |
| >Measurement ID | MP | | Measurement Identity 10.3.7.48 | |

In some embodiments, a priority for a certain RAT (e.g. UTRAN or LTE) and/or for frequency in the RAT is set. If the UE is not in the RAT with the highest priority, it looks for a radio access of higher priority to re-select the cell. The priority list may be t may be broadcasted in a System Information Block. If it is UE specific, it may be signaled in the UTRAN MOBILITY INFORMATION, which is dedicated to the UE. In case a priority for a RAT is set, the information about the measurements to be performed by the UE in CELL_FACH may be provided together with the priority, i.e. in the respective system information block or in the UTRAN MOBILITY INFORMATION.

In some of these embodiments, if LTE measurements are configured, the UE may measure one or more frequencies of the highest priority.

FIG. 2 shows an apparatus according to an embodiment of the invention. The apparatus may be a UE. FIG. 3 shows a method according to an embodiment of the invention. The apparatus according to FIG. 2 may perform the method of FIG. 3 but is not limited to this method. The method of FIG. 3 may be performed by the apparatus of FIG. 2 but is not limited to being performed by this apparatus.

The apparatus comprises flag detecting means 10, state detecting means 20, and measuring means 30.

The flag detecting means 10 may detect a flag (S10). The flag may be received in the CELL_FACH state or in another state such as the DCH state.

The state detecting means 20 may detect if the apparatus such as a UE is in the CELL_FACH state (S20). The sequence of steps S10 and S20 may be interchanged.

If both conditions of steps S10 and S20 are fulfilled, i.e. the flag is detected and the apparatus is in the CELL_FACH state, the measuring means 30 may perform a radio related measurement (S30).

FIG. 4 shows an apparatus according to an embodiment of the invention. The apparatus may be a base station. FIG. 5 shows a method according to an embodiment of the invention. The apparatus according to FIG. 4 may perform the method of FIG. 5 but is not limited to this method. The method of FIG. 5 may be performed by the apparatus of FIG. 4 but is not limited to being performed by this apparatus.

The apparatus comprises set flag providing means 110 and message providing means 120.

The flag providing means 110 may provide a flag to a user equipment, wherein the flag is associated to a radio related measurement (S110). A radio related measurement may be related to another RAT (inter-RAT measurement) or to the RAT the apparatus is attached too (intra-RAT measurement).

The message providing means 120 may provide to the user equipment a reconfiguration message such as RADIO BEARER RECONFIGURATION (S120). The reconfiguration message may comprise a parameter which is an identification of the radio related measurement.

Embodiments of the invention are described based on a release 10 system but embodiments of the invention may be applied to other releases and other radio access technologies comprising a FACH state.

A UE may be a user equipment, a terminal, a mobile phone, a laptop, a smartphone, a tablet PC, or any other device that may attach to the mobile network. A base station may be a NodeB, an eNodeB or any other base station of a radio network comprising a FACH state.

If not otherwise stated or otherwise made clear from the context, the statement that two entities are different means that they are differently addressed in their respective network. It does not necessarily mean that they are based on different hardware. That is, each of the entities described in the present description may be based on a different hardware, or some or all of the entities may be based on the same hardware.

According to the above description, it should thus be apparent that exemplary embodiments of the present invention provide, for example a user equipment apparatus such as a user equipment, or a component thereof, an apparatus embodying the same, a method for controlling and/or operating the same, and computer program(s) controlling and/or operating the same as well as mediums carrying such computer program(s) and forming computer program product(s).

Furthermore, it should thus be apparent that exemplary embodiments of the present invention provide, for example a base station apparatus such as a base station like a NodeB or eNodeB, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non limiting examples, implementations as hardware, software, firmware, special purpose circuits or logic, general purpose hardware or controller or other computing devices, or some combination thereof.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. An apparatus comprising a processor and a memory storing software code, wherein the memory with the software code is configured with the processor to cause the apparatus to at least:
   detect a received flag in a measurement control message dedicated to the apparatus and instructing the apparatus by a set of parameters to perform an inter-radio access technology (inter-RAT) measurement of at least one specific measurement ID in a forward access channel state;
   detect if the apparatus communicates in the forward access channel state;
   perform, if the apparatus communicates in the forward access channel state, the instructed inter-RAT measurement only if the flag is detected and the measurement control message is detected, wherein the inter-RAT measurement is radio related;
   transmit a result of the inter-RAT measurement while the apparatus is in the forward access channel state; and
   select a frequency of a radio access technology based on a received priority information;
   where the measurement is performed related to the selected frequency.

2. The apparatus according to claim 1, wherein the memory with the software code is configured with the processor to cause the apparatus to at least
   detect a parameter in a received reconfiguration message;
   inhibit performing the measurement if the apparatus communicates in the forward access channel state and the parameter is not detected.

3. User equipment comprising an apparatus according to claim 1.

4. An apparatus comprising a processor and a memory storing software code, wherein the memory with the software code is configured with the processor to cause the apparatus to at least:
   provide, to a user equipment, a flag associated to a radio related measurement in a measurement control message dedicated to the user equipment and instructing the user equipment by a set of parameters to perform an inter-radio access technology (inter-RAT) measurement of at least one specific measurement ID in a forward access channel state;
   provide a reconfiguration message to the user equipment, wherein the reconfiguration message orders the user equipment to go into the forward access channel state; and
   provide priority information related to a frequency for which the inter-RAT measurement is to be performed.

5. Base station, comprising an apparatus according to claim 4.

6. System, comprising
   a user equipment comprising an apparatus according to claim 2; and
   a base station comprising a base station processor and a base station memory storing base station software code, wherein the base station memory with the base station software code is configured with the base station processor to cause the base station to at least
   provide a reconfiguration message to the user equipment, wherein the reconfiguration message orders the user equipment to go into a forward access channel state and comprises an identification of the radio related measurement;
   provide a measurement control message dedicated to the user equipment, wherein the measurement control message comprises a flag associated to a radio related measurement and instructs the user equipment by a set of parameters to perform an inter-radio access technology (inter-RAT) measurement; and
   provide priority information related to a frequency for which the inter-RAT measurement is to be performed; wherein
   the forward access channel state of the user equipment corresponds to the forward access channel state of the base station;
   the flag received by the user equipment comprises the flag provided by the base station;
   the measurement control message received by the user equipment comprises the measurement control message dedicated to the user equipment provided by the base station;
   the reconfiguration message received by the user equipment comprises the reconfiguration message provided by the base station, wherein the parameter detected by the user equipment comprises the identification of the radio related measurement provided by the base station.

7. Method, comprising detecting a received flag in a measurement control message dedicated to an apparatus and instructing the apparatus by a set of parameters to perform an inter-radio access technology (inter-RAT) measurement of at least one specific measurement ID in a forward access channel state;

detecting if the apparatus performing the method communicates in the forward access channel state;

performing, if the apparatus communicates in the forward access channel state, the instructed inter-RAT measurement only if the flag is detected and if the measurement control message is detected, wherein the inter-RAT measurement is radio related;

selecting a frequency of a radio access technology based on a received priority information, wherein the inter-RAT measurement is performed related to the selected frequency; and transmit a result of the inter-RAT measurement while in the forward access channel state.

8. The method according to claim 7, further comprising detecting a parameter in a received reconfiguration message;

inhibiting performing the measurement if the apparatus communicates in the forward access channel state and the parameter is not detected.

9. Method, comprising providing, to a user equipment, a flag associated to a radio related measurement in a measurement control message dedicated to the user equipment and instructing the user equipment by a set of parameters to perform an inter-radio access technology (inter-RAT) measurement of at least one specific measurement ID in a forward access channel state;

providing a reconfiguration message to the user equipment, wherein the reconfiguration message orders the user equipment to go into the forward access channel state; and providing priority information related to a frequency for which the inter-RAT measurement is to be performed.

10. A computer readable memory tangibly storing software code that, when run on a processor of an apparatus, cause the apparatus to perform the method according to claim 7.

11. The computer program product according to claim 10, wherein the software code is directly loadable into a memory of the processor.

* * * * *